(12) United States Patent
Sugimoto et al.

(10) Patent No.: US 12,034,390 B2
(45) Date of Patent: Jul. 9, 2024

(54) WINDING SWITCHING DEVICE OF ROTATING ELECTRIC MACHINE, ROTATING ELECTRIC MACHINE DRIVE SYSTEM, AND ELECTRIC DEVICE

(71) Applicant: Hitachi, Ltd., Tokyo (JP)

(72) Inventors: Shinji Sugimoto, Tokyo (JP); Akeshi Takahashi, Tokyo (JP); Kazuo Nishihama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 344 days.

(21) Appl. No.: 17/598,067

(22) PCT Filed: Mar. 23, 2020

(86) PCT No.: PCT/JP2020/012604
§ 371 (c)(1),
(2) Date: Sep. 24, 2021

(87) PCT Pub. No.: WO2020/196365
PCT Pub. Date: Oct. 1, 2020

(65) Prior Publication Data
US 2022/0224270 A1     Jul. 14, 2022

(30) Foreign Application Priority Data

Mar. 25, 2019    (JP) .................................. 2019-055988

(51) Int. Cl.
*H02K 3/28*     (2006.01)
*H02P 25/18*    (2006.01)
(Continued)

(52) U.S. Cl.
CPC ............... *H02P 25/18* (2013.01); *H02K 3/28* (2013.01); *H02P 27/06* (2013.01); *H02P 21/18* (2016.02)

(58) Field of Classification Search
CPC . H02K 3/28; H02P 21/18; H02P 25/18; H02P 27/06; H02P 25/188
See application file for complete search history.

(56) References Cited

U.S. PATENT DOCUMENTS

2008/0116839 A1*   5/2008   Hoemann ............... H02P 25/18
                                                         318/772
2008/0238235 A1* 10/2008   Takahashi .............. H02K 21/46
                                                     310/156.78

(Continued)

FOREIGN PATENT DOCUMENTS

| JP | 2009-278841 A | 11/2009 |
|---|---|---|
| JP | 2009278841 A | * 11/2009 |
| JP | 2017-070112 A | 4/2017 |

OTHER PUBLICATIONS

JP-2009278841-A, Baba et al., all pages (Year: 2009).*
International Search Report, PCT/JP2020/012604, Jun. 2, 2020, 2 pgs.

*Primary Examiner* — Naishadh N Desai
(74) *Attorney, Agent, or Firm* — Volpe Koenig (57) ABSTRACT

A winding switching device switches parallel and series connections of windings of a rotating electric machine, and includes a plurality of electrodes that are connected to the windings and a power source, a movable portion in contact with the plurality of electrodes and includes a plurality of conductor portions, and an actuator that drives the movable portion. According to a contact state between the plurality of electrodes and the plurality of conductor portions, the windings are connected in parallel at a first position of the movable portion, and are connected in series at a second position of the movable portion. The electrodes include a first electrode connected to a first phase winding of the rotating electric machine in the plurality of windings, and a second electrode connected to a second phase winding. The (Continued)

first electrode and the second electrode are adjacent to each other, and form a neutral point.

9 Claims, 8 Drawing Sheets

(51) Int. Cl.
  *H02P 27/06* (2006.01)
  *H02P 21/18* (2016.01)

(56) References Cited

U.S. PATENT DOCUMENTS

2010/0289356 A1* 11/2010 Kida .................. H02K 11/02
                                                            310/71
2012/0306424 A1* 12/2012 Naik .................. H02P 25/18
                                                            318/495

* cited by examiner

PARALLEL WINDING

SERIES WINDING

WINDING SWITCHING DEVICE OF ROTATING ELECTRIC MACHINE, ROTATING ELECTRIC MACHINE DRIVE SYSTEM, AND ELECTRIC DEVICE

TECHNICAL FIELD

The present invention relates to a winding switching device for switching a connection state of a rotating electric machine, a rotating electric machine drive system including the winding switching device, and an electric machine driven by the rotating electric machine drive system including the winding switching device.

BACKGROUND ART

A technique for switching the connection state of windings is known in order to make the output characteristics of an electric motor, which is a rotating electric machine, different between a high speed range and a low speed range.

For example, the winding switching device described in PTL 1 includes a device main body including a plurality of electrodes to which the ends of a plurality of windings are connected, a movable body including a series connection circuit portion and a parallel connection circuit portion arranged in a switching direction, and a drive device for operating the movable body in the switching direction. When the movable body is operated by the drive device and the electrodes of the device body come into contact with the electrodes of the series connection circuit portion and the parallel connection circuit portion in the movable body, the windings of the electric motor are connected in the series state and the parallel state, respectively.

CITATION LIST

Patent Literature

PTL 1: JP 2017-70112 A

SUMMARY OF INVENTION

Technical Problem

If the winding switching device according to the related art includes an electric motor and an inverter for supplying power to the electric motor, and is installed in the rotating electric machine drive system for driving the electric motor at variable speed, there is a problem that the rotating electric machine drive system is increased in size.

Therefore, the invention is to provide a winding switching device capable of miniaturization and suppressing an increase in size of the drive system, a rotating electric machine drive system including the winding switching device, and an electric machine driven by the rotating electric machine drive system which includes the winding switching device.

Solution to Problem

In order to solve the above problems, a winding switching device according to the invention switches parallel connection and series connection of a plurality of windings of a rotating electric machine. The winding switching device includes a plurality of electrodes that are connected to the plurality of windings and a power source, a movable portion that is in contact with the plurality of electrodes and includes a plurality of conductor portions, and an actuator that drives the movable portion. According to a contact state between the plurality of electrodes and the plurality of conductor portions, the plurality of windings are connected in parallel at a first position of the movable portion, and the plurality of windings are connected in series at a second position of the movable portion. The plurality of electrodes include a first electrode connected to a first phase winding of the rotating electric machine in the plurality of windings, and a second electrode connected to a second phase winding of the rotating electric machine in the plurality of windings. The first electrode and the second electrode are adjacent to each other, and form a neutral point.

In order to solve the above problems, the rotating electric machine drive system according to the invention includes a rotating electric machine and an inverter that supplies AC power to the rotating electric machine, and the winding switching device is the winding switching device according to the invention.

In order to solve the above problems, the electric machine according to the invention is operated at variable speed by the rotating electric machine drive system, and the rotating electric machine drive system is the rotating electric machine drive system according to the invention.

Advantageous Effects of Invention

According to the invention, the winding switching device can be miniaturized.

Objects, configurations, and effects besides the above description will be apparent through the explanation on the following embodiments.

DESCRIPTION OF EMBODIMENTS

First, a rotating electric machine drive system according to an embodiment of the invention will be described with reference to FIGS. 2 to 5.

Figure 2:
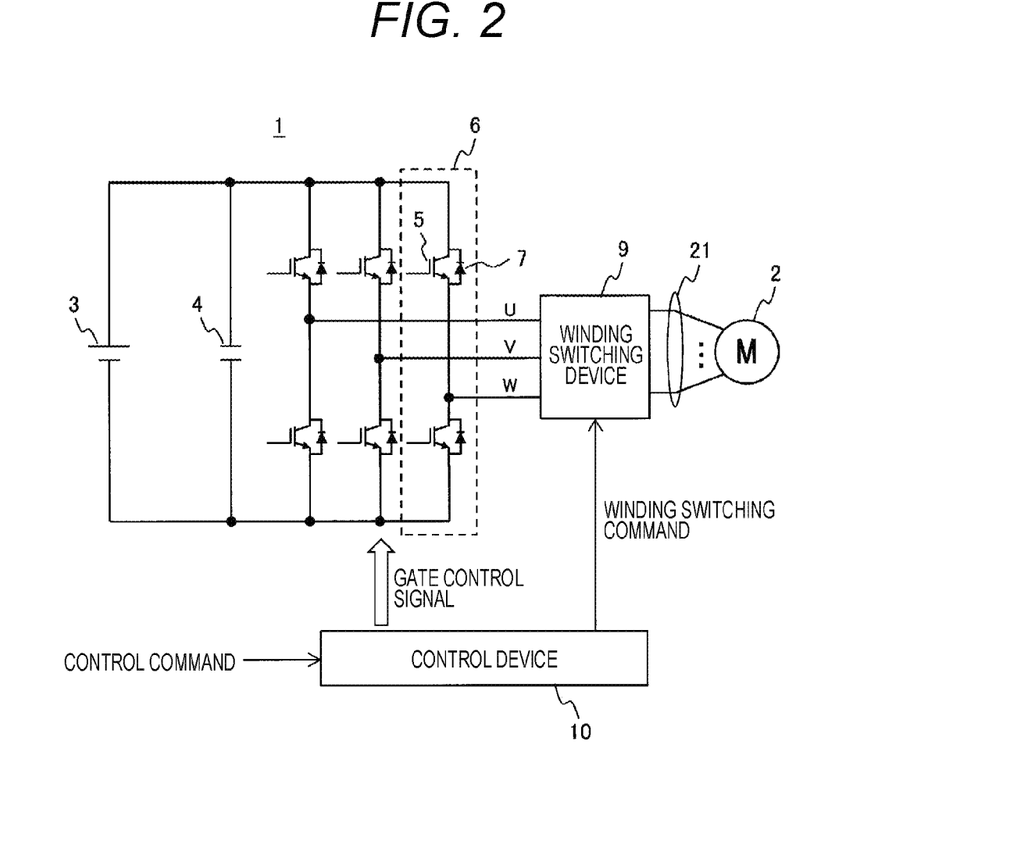
FIG. 2 is a circuit diagram of a rotating electric machine drive system according to an embodiment.

FIG. 2 is a circuit diagram of the rotating electric machine drive system according to an embodiment of the invention.

In the rotating electric machine drive system 1, a three-phase AC motor 2 is driven by the AC power from an inverter main circuit that converts DC power into AC power by a semiconductor switching element 5. As the three-phase AC motor 2, for example, a permanent magnet synchronous motor is applied.

The inverter main circuit includes a three-phase full bridge circuit including six semiconductor switching elements 5 and a freewheeling diode 7 connected in antiparallel to each of the six semiconductor switching elements 5. In this embodiment, the three-phase full bridge circuit is configured by connecting three power modules 6 in parallel. In one power module 6, two arms including a set of the semiconductor switching element 5 and the freewheeling diode 7 are connected in series.

A capacitor 4 is connected to the DC input side of the three-phase full bridge circuit. The capacitor 4 smoothens the input voltage from a DC power source 3. The DC power supplied from the DC power source 3 is smoothed by the capacitor 4 and input to the three-phase full bridge circuit.

When the semiconductor switching element 5 is on/off controlled by a gate control signal output by a control device 10 in FIG. 2, the inverter main circuit converts the DC power from the DC power source into three-phase AC power, and output the DC power from AC output terminals (U, V, W). In this embodiment, the series connection points of the two arms in the power module 6 serve as AC output terminals. The three-phase AC motor 2 is driven by the three-phase AC power output from the inverter main circuit.

The control device 10 in FIG. 2 creates a gate control signal in response to a control command from a host control device (not illustrated). Therefore, by setting the control command as a speed command, the three-phase AC motor 2 is driven at a variable speed.

As illustrated in FIG. 2, a winding switching device 9 for switching the connection state of the three-phase windings is connected between the AC output terminals (U, V, W) of the inverter main circuit and a three-phase winding terminal group 21 of the three-phase AC motor 2. The winding switching device 9 switches the connection state of the three-phase windings in response to a winding switching command from the control device 10. The control device 10 connects the windings in series when the speed is in a low speed range, and connects the windings in parallel when the speed is in a high speed range, as described later, according to the speed of the three-phase AC motor 2. The control device 10 determines whether the speed of the three-phase AC motor 2 is in a predetermined low speed range or high speed range based on the control command (speed command) and a speed detection value (or speed estimation value), and creates a winding switching command according to the determination result.

The winding switching device 9 in this embodiment has a function of switching the connection state of the windings as described above. As a result, the three-phase AC motor 2 can be operated with high efficiency within an operable speed range.

In the inverter main circuit of FIG. 2, an electrolytic capacitor or a film capacitor can be applied as the capacitor 4. Further, the capacitor 4 may be configured by connecting a plurality of small-capacity capacitors in parallel or in series in order to increase the capacity. In FIG. 2, an IGBT (Insulated Gate Bipolar Transistor) is applied as the semiconductor switching element 5, but the invention is not limited to this, and a MOSFET (Metal Oxide Semiconductor Field Effect Transistor) or the like may be applied. Further, the freewheeling diode 7 may be externally attached to or incorporated in the semiconductor switching element. When the semiconductor switching element 5 is a MOSFET, the body diode (parasitic diode) in the element may be used as the freewheeling diode 7.

Figure 3:
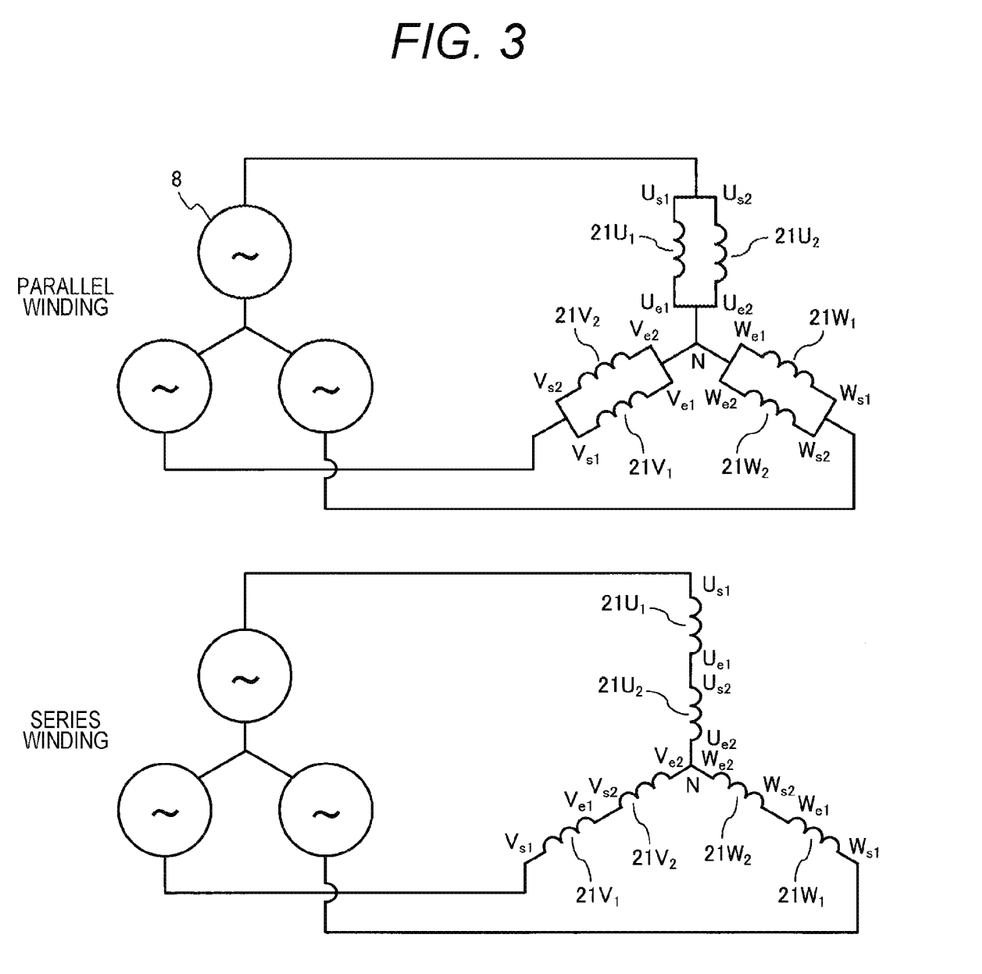
FIG. 3 is a circuit diagram illustrating a connection state of three-phase windings of a three-phase AC motor according to an embodiment.

FIG. 3 is a circuit diagram illustrating the connection state of the three-phase windings of the three-phase AC motor 2 in this embodiment.

The three-phase AC motor 2 includes a plurality of (two in FIG. 3) three-phase windings. That is, the three-phase AC motor 2 includes a first three-phase winding consisting of a winding group of a U-phase winding $21U_1$, a V-phase winding $21V_1$ and a W-phase winding $21W_1$, and a second three-phase winding consisting of a winding group of a U-phase winding $21U_2$, a V-phase winding $21V_2$, and a W-phase winding $21W_2$.

The upper part of FIG. 3 illustrates the connection state of the parallel winding, and the winding of each phase in the first three-phase winding and the winding of each phase in the second three-phase winding are connected in parallel. For example, for the U phase, a winding start $U_{s1}$ of the U-phase winding $21U_1$ and a winding start $U_{s2}$ of the U-phase winding $21U_2$ are connected, and a winding end $U_{e1}$ of the U-phase winding $21U_1$ and a winding end $U_{e1}$ of the U-phase winding $21U_2$ are connected. As a result, the U-phase winding $21U_1$ and the U-phase winding $21U_2$ are connected in parallel. The parallel connection of the U-phase winding $21U_1$ and the U-phase winding $21U_2$ constitutes the U-phase winding of the three-phase AC motor 2.

As for the V phase and W phase, as illustrated in the upper part of FIG. 3, the V-phase winding $21V_1$ and the V-phase winding $21V_2$ are connected in parallel in the same manner as the U phase to form the V-phase winding of the three-phase AC motor 2. The W-phase winding $21W_1$ and the W-phase winding $21W_2$ are connected in parallel to form the W-phase winding of the three-phase AC motor 2.

The winding ends of both ends of the U-phase winding, V-phase winding, and W-phase winding of the three-phase AC motor 2 configured in this way are connected to each other to form a neutral point. That is, the U-phase winding, the V-phase winding, and the W-phase winding of the three-phase AC motor 2 are star-connected (Y-connected). In addition, the winding starts of both ends of the U-phase winding, V-phase winding, and W-phase winding of the three-phase AC motor 2 are connected to the three-phase AC power source 8 (the AC outputs U, V, and W of the inverter main circuit in FIG. 2).

In the drawing, as with the symbols $U_{si}$ and $U_{ei}$ (i=1, 2) described above, $V_{si}$ and $V_{ei}$ indicate the winding start and winding end of the V-phase winding $21V_i$, respectively, and $W_{si}$ and $W_{ei}$ indicate the winding start and the winding end of the W-phase winding $21W_i$, respectively. Hereinafter, the winding start and winding end of each phase winding will be described by symbols only as appropriate.

The lower part of FIG. 3 illustrates the connection state of the series winding, and the winding of each phase in the first three-phase winding and the winding of each phase in the second three-phase winding are connected in series. For example, for the U phase, the winding end $U_{e1}$ of the U-phase winding $21U_1$ and the winding start $U_{s2}$ of the U-phase winding $21U_2$ are connected. As a result, the U-phase winding $21U_1$ and the U-phase winding $21U_2$ are connected in series. The U-phase winding of the three-phase AC motor 2 is constructed by connecting the U-phase winding $21U_1$ and the U-phase winding $21U_2$ in series.

As for the V phase and W phase, as illustrated in the lower part of FIG. 3, the V-phase winding $21V_1$ and the V-phase winding $21V_2$ are connected in series in the same manner as the U phase to form the V-phase winding of the three-phase AC motor 2. The W-phase winding 21W₁ and the W-phase winding 21W₂ are connected in series to form the W-phase winding of the three-phase AC motor 2.

The winding ends of both ends of the U-phase winding, V-phase winding, and W-phase winding of the three-phase AC motor 2 configured in this way are connected to each other to form a neutral point. That is, the U-phase winding, the V-phase winding, and the W-phase winding of the three-phase AC motor 2 are star-connected (Y-connected). In addition, the winding starts of both ends of the U-phase winding, V-phase winding, and W-phase winding of the three-phase AC motor 2 are connected to the three-phase AC power source 8 (the AC outputs U, V, and W of the inverter main circuit in FIG. 2).

Next, the difference in the characteristics of the electric motor depending on the connection state of the windings will be described.

A harmonic loss $W_h$ generated by the rotating electric machine when the rectangular wave voltage output by the inverter main circuit is supplied to the rotating electric machine is represented by Expression (2).

[Math. 1]

$$W_h = K \cdot I_n^2 \quad (1)$$

Here, K is the proportional coefficient, $V_n$ is the nth harmonic component of the rectangular wave voltage, and $I_n$ is the nth harmonic component of the current flowing through the winding. There is a relationship of Expression (2) between $V_n$ and $I_n$.

[Math. 2]

$$I_n = \frac{V_n}{Z_n} \quad (2)$$

Here, the impedance Zn is expressed by Expression (3).

[Math. 3]

$$Z_n = R + 2j\pi f_n L \quad (3)$$

Here, R is the resistance of the winding of the rotating electric machine, L is the inductance of the winding of the rotating electric machine, and $f_n$ is the frequency of the nth harmonic component.

Expression (4) is obtained by Expressions (1), (2), and (3).

[Math. 4]

$$W_h = K \frac{V_n^2}{(R + 2\pi j f_n L)^2} \quad (4)$$

Here, since $R \ll 2\pi j f_n$, Expression (5) can be obtained by simplifying Expression (4).

[Math. 5]

$$W_h = K \frac{V_n^2}{(2 j\pi f_n L)^2} \quad (5)$$

Assuming that each inductance of the two windings whose connection state can be changed is $L_0$, the inductance $L_s$ of the series connection and the inductance $L_p$ of the parallel connection are expressed by Expressions (6) and (7), respectively.

[Math. 6]

$$L_s = 2L_0 \quad (6)$$

[Math. 7]

$$L_p = \frac{L_0}{2} \quad (7)$$

Assuming that the harmonic losses in the case of parallel connection and series connection are $W_{hp}$ and $W_{hs}$, respectively, the voltage applied from the inverter main circuit is the same $V_n$. Therefore, with $L=L_p$ and $L=L_s$ in Expression (5), $W_{hp}$ and $W_{hs}$ are represented by Expressions (8) and (9) using Expressions (6) and (7), respectively.

[Math. 8]

$$W_{hp} = K \frac{V_n^2}{(j\pi f_n L_0)^2} \quad (8)$$

[Math. 9]

$$W_{hs} = K \frac{V_n^2}{(4 j\pi f_n L_0)^2} \quad (9)$$

As represented by Expressions (8) and (9), the harmonic loss $W_{hs}$ of the series connection is smaller than the harmonic loss $W_{hp}$ of the parallel connection.

Next, the result of the present inventor's study on the efficiency of the rotating electric machine based on such harmonic loss will be described.

Figure 4:
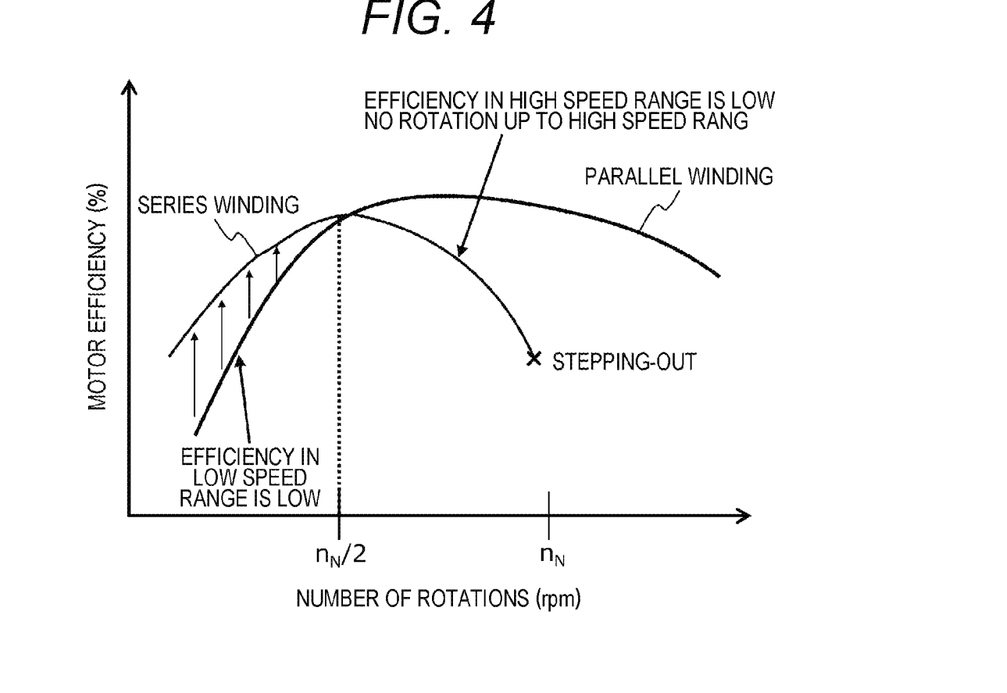
FIG. 4 is a diagram illustrating an example of the relationship between the number of rotations of an electric motor and the efficiency of an electric motor (motor).

FIG. 4 is a diagram illustrating an example of the relationship between the number of rotations of the electric motor and the electric motor (motor) efficiency.

As illustrated in FIG. 4, in the case of parallel winding (parallel connection), the efficiency is low in the low speed range, and high in the high speed range because the output can be increased. On the other hand, in the case of series winding (series connection), the efficiency is high in the low speed range, but the efficiency is low in the high speed range because the output is small.

Figure 5:
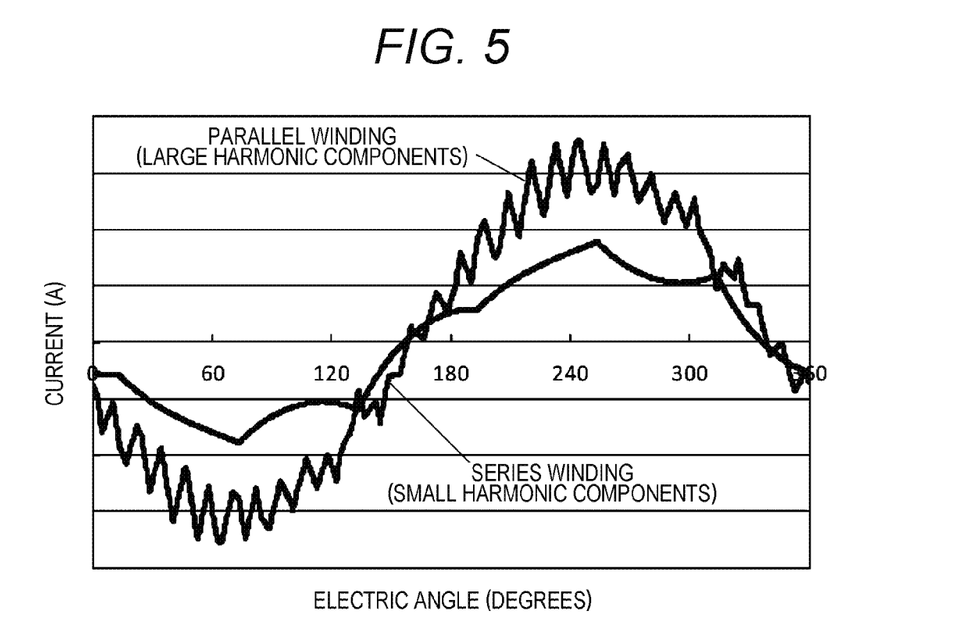
FIG. 5 is a diagram illustrating an example of a current waveform when the same rectangular wave voltage is applied to the windings of parallel connection and series connection.

FIG. 5 is a diagram illustrating an example of a current waveform when the same rectangular wave voltage is applied to the windings of the parallel connection and the series connection. Since the winding inductance of the series connection is larger than the inductance of the parallel connection as represented in Expressions (6) and (7), the harmonic component of the series connection is less than the harmonic component of the parallel connection as illustrated in FIG. 5.

Based on the difference in the generated loss due to the connection state of the windings as described above, the winding switching device makes a series connection in the low speed range of the rotating electric machine and a parallel connection in the high speed range of the rotating electric machine, so that the rotating electric machine can be operated with high efficiency in a wide speed range.

Hereinafter, the winding switching device according to the embodiment of the invention will be described by the following first to third embodiments with reference to FIGS. 1, and 6 to 8. The components attached with the same symbol in the drawings are the same components or the components having a similar function.

First Embodiment

Figure 1:
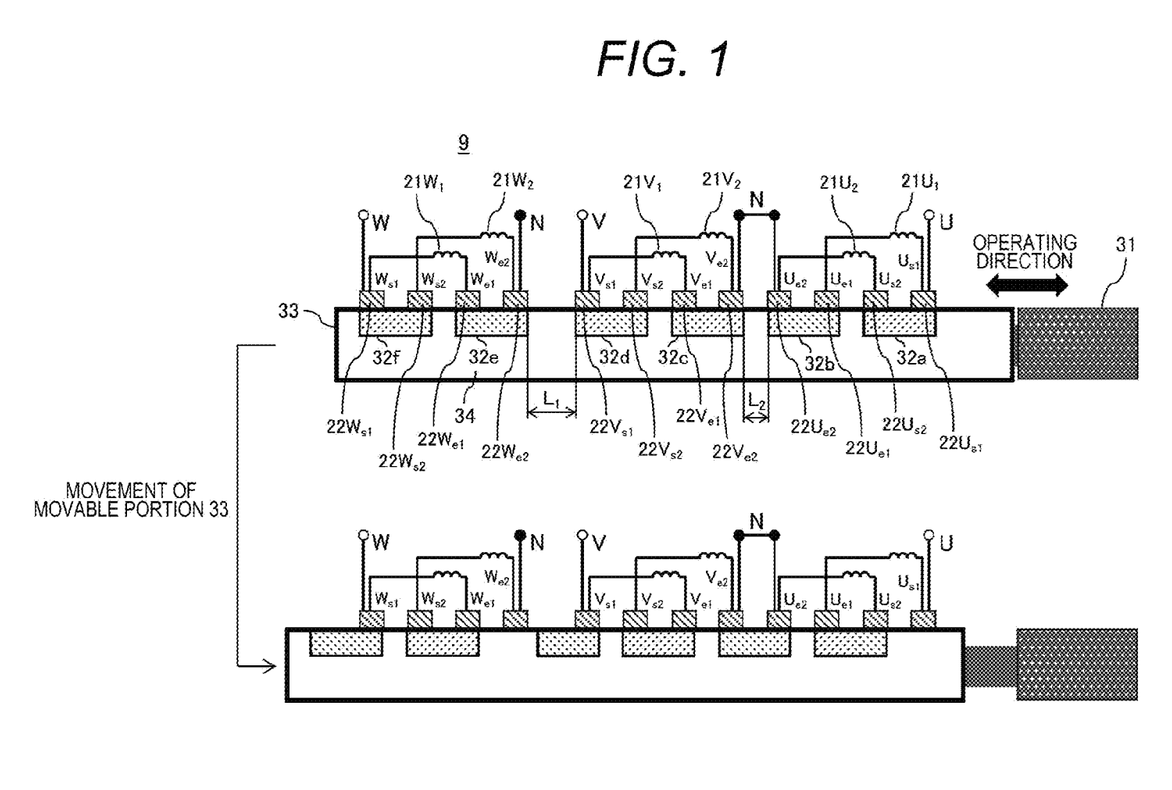
FIG. 1 is a configuration diagram of a winding switching device according to a first embodiment.

FIG. 1 is a configuration diagram of a winding switching device according to a first embodiment of the invention. Note that FIG. 1 also illustrates the operation of the winding switching device. I$_n$ order not to complicate the drawing, most of the symbols indicating each part of the winding switching device are illustrated only in the upper part of FIG. 1.

As illustrated in the upper part of FIG. 1, the winding switching device 9 of the first embodiment includes a plurality of electrodes (22U$_{si}$, 22U$_{ei}$, 22V$_{si}$, 22V$_{ei}$, 22W$_{si}$, 22W$_{ei}$: i=1, 2) to which the winding starts (U$_{si}$, V$_{si}$, W$_{si}$: i=1, 2) and the winding ends (U$_{ei}$, V$_{ei}$, W$_{ei}$: i=1, 2) of the phase windings (21U$_i$, 21V$_i$, 21W$_i$: i=1, 2) constituting the plurality of three-phase windings are connected, a movable portion 33 which has a plurality of conductor portions (32a to 32f) short-circuiting two adjacent electrodes in the plurality of electrodes, and an actuator 31 for driving the movable portion 33.

The plurality of electrodes (22U$_{si}$, 22U$_{ei}$, 22V$_{si}$, 22V$_{ei}$, 22W$_{si}$, 22W$_{ei}$: i=1, 2) are separated from each other, and electrically isolated in a state where the phase windings are not connected and the electrodes are not short-circuited by the conductor portions (32a to 32f) of the movable portion 33. Further, the plurality of electrodes are fixed to a support (not illustrated). Further, the plurality of conductor portions (32a to 32f) in the movable portion 33 are separated from each other and electrically isolated in a support 34 when being fixed to the support 34.

The plurality of electrodes (22U$_{si}$, 22U$_{ei}$, 22V$_{si}$, 22V$_{ei}$, 22W$_{si}$, 22W$_{ei}$: i=1, 2) are arranged side by side in a predetermined direction at intervals from each other. Further, the plurality of conductor portions (32a to 32f) are arranged side by side in the same direction as the direction in which the plurality of electrodes are lined up at intervals from each other. Since the movable portion 33 is in contact with the plurality of electrodes, when the movable portion 33 slides along the direction in which the plurality of electrodes and the conductor portions are lined up by the actuator 31, a short-circuited state of the plurality of electrodes due to the plurality of conductor portions changes sequentially. As a result, the connection state of the windings of the three-phase AC motor changes. In the first embodiment, in ascending order of movement amount of the movable portion 33 from the actuator 31 side, the connection state of the phase windings becomes parallel winding (the upper part in FIG. 3) and series winding (the lower part in FIG. 3) at a first position (the upper part of FIG. 1) and a second position (the lower part of FIG. 1) of the movable portion 33, respectively.

The more detailed configuration and operation of the winding switching device of the first embodiment are as follows.

As illustrated in the upper part of FIG. 1, twelve electrodes 22U$_{s1}$, 22U$_{s2}$, 22U$_{e1}$, 22U$_{e2}$, 22V$_{e2}$, 22V$_{e1}$, 22V$_{s2}$, 22V$_{s1}$, 22W$_{e2}$, 22W$_{e1}$, 22W$_{s2}$, and 22W$_{s1}$, which are the same in total number of the winding starts and the winding ends of each phase winding of the first three-phase winding (21U$_1$, 21V$_1$, 21W$_1$) and the second three-phase winding (21U$_2$, 21V$_2$, 21W$_2$), are arranged side by side in this order in a predetermined direction at intervals from each other in a direction away from the actuator 31 in the first embodiment. These electrodes 22U$_{s1}$, 22U$_{s2}$, 22U$_{e1}$, 22U$_{e2}$, 22V$_{e2}$, 22V$_{e1}$, 22V$_{s2}$, 22V$_{s1}$, 22W$_{e2}$, 22W$_{e1}$, 22W$_{s2}$, and 22W$_{s1}$ each are electrically connected to the winding start U$_{s1}$ of the U-phase winding 21U$_1$, the winding start U$_{s2}$ of the U-phase winding 21U$_2$, the winding end U$_{e1}$ of the U-phase winding 21U$_1$, the winding end U$_{e2}$ of the U-phase winding 21U$_2$, the winding end V$_{e2}$ of the V-phase winding 21V$_2$, the winding end V$_{e1}$ of the V-phase winding 21V$_1$, the winding start V$_{s2}$ of the V-phase winding 21V$_2$, the winding start V$_{s1}$ of the V-phase winding 21V$_1$, the winding end W$_{e2}$ of the W-phase winding 21W$_2$, the winding end W$_{e1}$ of the W-phase winding 21W$_1$, the winding start W$_{s2}$ of the W-phase winding 21W$_2$, and the winding start W$_{s1}$ of the W-phase winding 21W$_1$.

Therefore, a U-phase winding connection electrode group consisting of the electrodes 22U$_{s1}$, 22U$_{s2}$, 22U$_{e1}$, and 22U$_{e2}$ connecting the U-phase windings 21U$_1$ and 21U$_2$ and a V-phase winding connection electrode group consisting of the electrodes 22V$_{e2}$, 22V$_{e1}$, 22V$_{s2}$, and 22V$_{s1}$ connecting the V-phase windings 21V$_1$ and 21V$_2$, and a W-phase winding connection electrode group consisting of the electrodes 22W$_{e2}$, 22W$_{e1}$, 22W$_{s2}$, and 22W$_{s1}$ connecting the W-phase winding 21W$_1$ and 21W$_2$ are lined up in this order in the direction away from the actuator 31.

Of the electrodes (22U$_{s1}$, 22U$_{e2}$) located at both ends of the U-phase winding connection electrode group, the electrode (22U$_{s1}$) located at one end on the actuator 31 side is connected to the corresponding one phase of the three-phase AC power source, that is, the U phase. The electrode (22U$_{e2}$) located at the other end constitutes the neutral point (N) in the star connection (Y connection) of the three-phase windings.

Further, of the electrodes (22V$_{e2}$, 22V$_{s1}$) located at both ends of the V-phase winding connection electrode group, the electrode (22V$_{e2}$) located at one end on the actuator 31 side is the neutral point (N) in the star connection of the three-phase windings. The electrode (22V$_{s1}$) located at the other end is connected to the corresponding one phase, that is, the V-phase of the three-phase AC power source.

Furthermore, of the electrodes (22W$_{e2}$, 22W$_{s1}$) located at both ends of the W-phase winding connection electrode group, the electrode (22W$_{e2}$) located at one end on the actuator 31 side is the neutral point (N) in the star connection of the three-phase windings. The electrode (22W$_{s1}$) located at the other end is connected to the corresponding one phase, that is, the W-phase of the three-phase AC power source.

The six conductor portions 32a, 32b, 32c, 32d, 32e, and 32f included in the movable portion 33 are lined up and arranged in the same predetermined direction as the direction of the electrodes 22U$_{s1}$, 22U$_{s2}$, 22U$_{e1}$, 22U$_{e2}$, 22V$_{e2}$, 22V$_{e1}$, 22V$_{s2}$, 22V$_{s1}$, 22W$_{e2}$, 22W$_{e1}$, 22W$_{s2}$, and 22W$_{s1}$ in this order at intervals from each other in a direction away from the actuator 31 in the first embodiment.

The movable portion 33 is moved by the actuator 31 along the direction in which the plurality of electrodes (22U$_{s1}$, . . . ) and the conductor portions (32a, . . . ) are arranged, that is, along the operating direction in FIG. 3. At this time, the stop position of the movable portion 33 is either the position illustrated in the upper part of FIG. 1 (first position) or the position illustrated in the lower part of FIG. 1 (second position).

As illustrated in the upper part of FIG. 1, at the first position, the electrode 22U$_{s1}$ and the electrode 22U$_{s2}$ are short-circuited by the conductor portion 32a, and the electrode 22U$_{e1}$ and the electrode 22U$_{e2}$ are short-circuited by the conductor portion 32b. As a result, the winding start U$_{si}$ and the winding end $U_{e1}$ of the U-phase winding $21U_1$ are electrically connected to the winding start $U_{s2}$ and the winding end $U_{e1}$ of the U-phase winding $21U_2$, respectively. That is, the U-phase winding $21U_1$ and the U-phase winding $21U_2$ are connected in parallel.

At the first position, the electrode $22V_{e2}$ and the electrode $22V_{e1}$ are short-circuited by the conductor portion 32c, and the electrode $22V_{s2}$ and the electrode $22V_{s1}$ are short-circuited by the conductor portion 32d. As a result, the winding start $V_{s1}$ and the winding end $V_{e1}$ of the V-phase winding $21V_1$ are electrically connected to the winding start $V_{s2}$ and the winding end $V_{e2}$ of the V-phase winding $21V_2$, respectively. That is, the V-phase winding $21V_1$ and the V-phase winding $21V_2$ are connected in parallel.

Further, at the first position, the electrode $22W_{e2}$ and the electrode $22W_{e1}$ are short-circuited by the conductor portion 32e, and the electrode $22W_{s2}$ and the electrode $22W_{s1}$ are short-circuited by the conductor portion 32f. As a result, the winding start $W_{s1}$ and the winding end $W_{e1}$ of the W-phase winding $21W_1$ are electrically connected to the winding start $W_{s2}$ and the winding end Wee of the W-phase winding $21W_2$, respectively. That is, the W-phase winding $21W_1$ and the W-phase winding $21W_2$ are connected in parallel.

As described above, at the first position of the movable portion 33, the connection state of each phase winding of the three-phase AC motor becomes the parallel winding as illustrated in the upper part of FIG. 3.

Here, in the first embodiment, the distance between the electrode $22U_{e2}$ located at the other end of the U-phase winding connection electrode group and the electrodes $22V_{e2}$ located at one end of the V-phase winding connection electrode group (in FIG. 1, the distance $L_2$ between the end of the electrode $22U_{e2}$ and the end of the electrode $22U_{e2}$ adjacent to and facing each other) in a direction where the plurality of electrodes and the plurality of conductor portions are lined up is smaller than the distance between the electrode $22V_{s1}$ located at the other end of the V-phase winding connection electrode group and the electrode $22W_{e2}$ located at one end of the W-phase winding connection electrode group (in FIG. 1, the distance $L_1$ between the end of the electrode $22V_{s1}$ and the end of the electrode $22W_{e2}$ adjacent and facing each other) ($L_2 < L_1$).

As described above, the electrodes $22U_{e2}$ and $22V_{e2}$ form the neutral point N, so that they always have the same potential. Therefore, the distance $L_2$ between the electrode $22U_{e2}$ and the electrode $22V_{e2}$ can be reduced without impairing the electrical reliability. As a result, the size of the winding switching device 9 can be reduced.

As illustrated in the lower part of FIG. 1, at the second position, the electrode $22U_{s1}$ is not in contact with the conductor portion, and the electrode $22U_{s2}$ and the electrode $22U_{e1}$ are short-circuited by the conductor portion 32a. As a result, the winding end $U_{e1}$ of the U-phase winding $21U_1$ and the winding start $U_{s2}$ of the U-phase winding $21U_2$ are electrically connected. That is, the U-phase winding $21U_1$ and the U-phase winding $21U_2$ are connected in series.

At the second position, the electrode $22V_{e1}$ and the electrode $22V_{s2}$ are short-circuited by the conductor portion 32c. As a result, the winding end $V_{e1}$ of the V-phase winding $21V_1$ and the winding start $V_{s2}$ of the V-phase winding $21V_2$ are electrically connected. That is, the V-phase winding $21V_1$ and the V-phase winding $21V_2$ are connected in series. The electrode $22U_{e2}$ and the electrode $22V_{e2}$ are short-circuited by the conductor portion 32b, but since these electrodes $22U_{e2}$ and $22V_{e2}$ form the neutral point N, they do not affect the connection state and the electrical reliability.

Further, at the second position, the electrode $22W_{e2}$ is not in contact with the conductor portion, and the electrode $22W_{e1}$ and the electrode $22W_{s2}$ are short-circuited by the conductor portion 32e. As a result, the winding end $W_{e1}$ of the W-phase winding $21W_1$ and the winding start $W_{s2}$ of the W-phase winding $21W_2$ are electrically connected. That is, the W-phase winding $21W_1$ and the W-phase winding $21W_2$ are connected in series. The electrode $22W_{s1}$ is in contact with the conductor portion 32f, but the conductor portion 32f is not in contact with other electrodes and is in contact with only the electrode $22W_{s1}$. Therefore, the contact between the electrode $22W_{s1}$ and the conductor portion 32f does not affect the connection state and the electrical reliability.

As described above, at the second position of the movable portion 33, the connection state of each phase winding of the three-phase AC motor becomes the series winding illustrated in the lower part of FIG. 3.

In the first embodiment, as illustrated in FIG. 1, between the V-phase winding connection electrode group and the W-phase winding connection electrode group, the electrode $22V_{s1}$ to which the winding start $V_{s1}$ of the V-phase winding $21V_1$ is connected and the electrode $22W_{e2}$ to which the winding end Wee of the W-phase winding $21W_2$ are arranged adjacent. The electrode $22V_{s1}$ is connected to the V phase of the three-phase AC power source, and the electrode $22W_{e2}$ constitutes the neutral point N. Therefore, although $L_1 > L_2$, the electrical state between the V-phase winding connection electrode group and the W-phase winding connection electrode group is the same as in the case of the related art or in the comparative example (FIG. 6) described later. The distance between the V-phase winding connection electrode group and the W-phase winding connection electrode group does not increase. Therefore, in the first embodiment, it is advantageous that the neutral point N is formed between the adjacent electrode groups and the electrodes having the same potential are always set to be adjacent in order to reduce the dimension of the winding switching device 9 in the operating direction of the movable portion 33. As a result, the size of the winding switching device can be reliably reduced.

The actuator 31 is driven by a drive control device (not illustrated). This drive control device sets the stop position of the movable portion 33 to one of the above-mentioned first and second positions by driving the actuator 31 in response to the winding switching command illustrated in FIG. 2.

Figure 6:
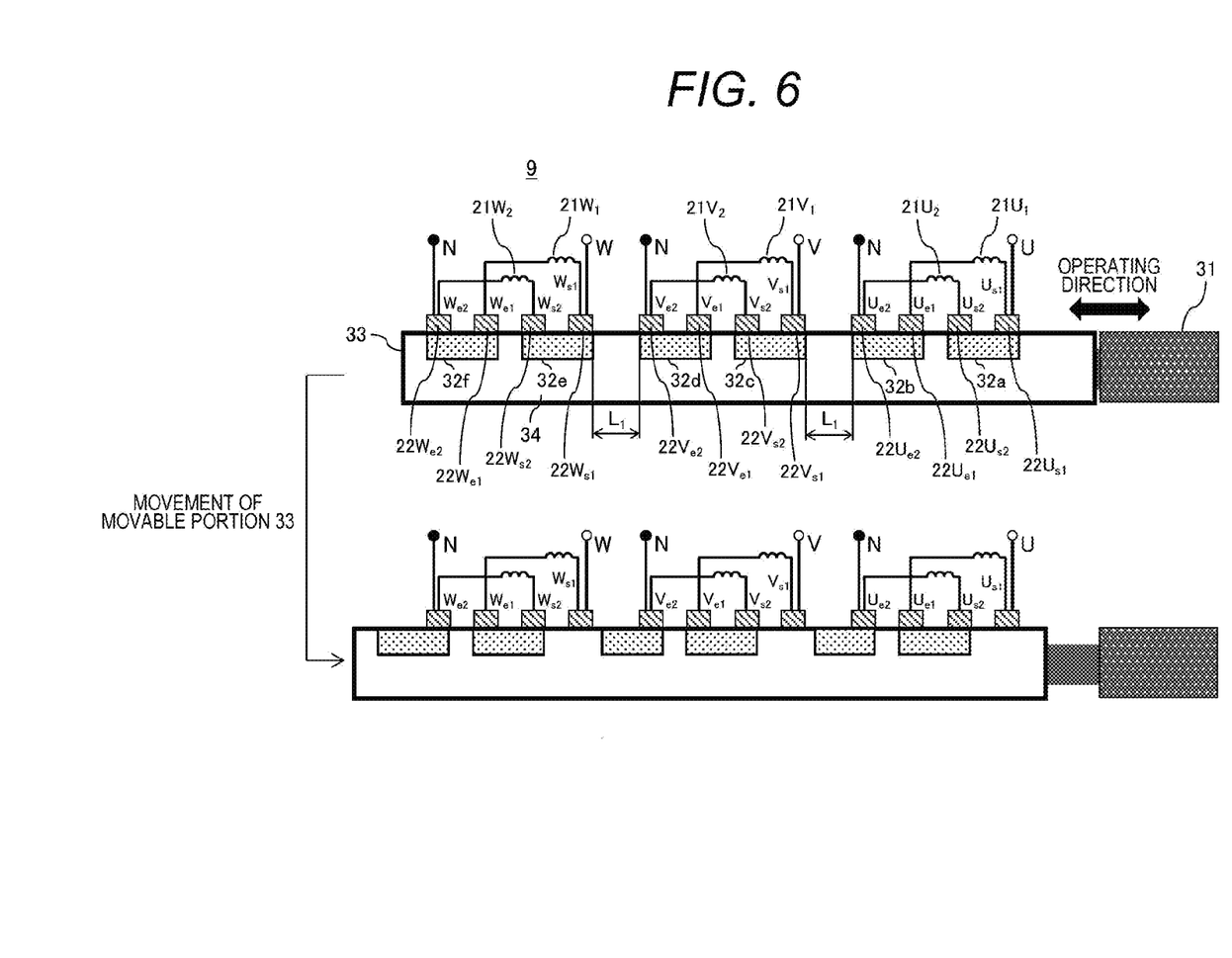
FIG. 6 is a configuration diagram of a winding switching device which is a comparative example with respect to the first embodiment.

FIG. 6 is a configuration diagram of a winding switching device which is a comparative example with respect to the first embodiment. I$_n$ addition, in FIG. 6, the operation of the winding switching device is also illustrated in the same manner as in FIG. 1.

As illustrated in FIG. 6, in this comparative example, the arrangement order of the plurality of electrodes ($22U_{si}$, $22U_{ei}$, $22V_{si}$, $22V_{ei}$, $22W_{si}$, $22W_{ei}$: i=1, 2) is different from that in FIG. 1 (upper part). That is, as illustrated in the upper part of FIG. 6, twelve electrodes $22U_{s1}$, $22U_{s2}$, $22U_{e1}$, $22U_{e2}$, $22V_{s1}$, $22V_{s2}$, $22V_{e1}$, $22V_{e2}$, $22W_{s1}$, $22W_{s2}$, $22W_{e1}$, and $22W_{e2}$, which are the same in total number of the winding starts and the winding ends of each phase winding of the first three-phase winding ($21U_1$, $21V_1$, $21W_1$) and the second three-phase winding ($21U_2$, $21V_2$, $21W_2$), are arranged side by side in this order in a predetermined direction at intervals from each other in a direction away from the actuator 31 in the first embodiment.

Therefore, between the U-phase winding connection electrode group ($22U_{si}$, $22U_{ei}$: i=1, 2) and the V-phase winding connection electrode group ($22V_{si}$, $22V_{ei}$: i=1, 2) that are adjacent to each other, the electrode $22U_{e2}$ constituting the neutral point (N) and the electrode $22V_{s1}$ connected to the V phase of the three-phase AC power source are adjacent to each other. Therefore, it is difficult to reduce the distance $L_1$ between the end of the electrode $22U_{e2}$ and the end of the electrode $22V_{s1}$ which face each other.

In addition, between the V-phase winding connection electrode group ($22V_{si}$, $22V_{ei}$: i=1, 2) and the W-phase winding connection electrode group ($22W_{si}$, $22W_{ei}$: i=1, 2) that are adjacent to each other, the electrode $22V_{e2}$ constituting the neutral point (N) and the electrode $22W_{s1}$ connected to the W phase of the three-phase AC power source are adjacent to each other. Therefore, it is difficult to reduce the distance $L_1$ between the end of the electrode $22V_{e2}$ and the end of the electrode $22W_{s1}$ which face each other.

As described above, in the comparative example of FIG. 6, it is difficult to reduce the size of the winding switching device.

As described above, according to the first embodiment, the size of the winding switching device can be reduced without impairing the reliability of the connection state switching function of the winding of the electric motor. In the first embodiment, since the movable portion 33 is linearly driven by the actuator 31 to switch the winding connection, the width direction dimension of the winding switching device can also be reduced. Therefore, even if there are restrictions on the width dimension when installing the winding switching device in the rotating electric machine drive system, it can be installed.

Second Embodiment

Figure 7:
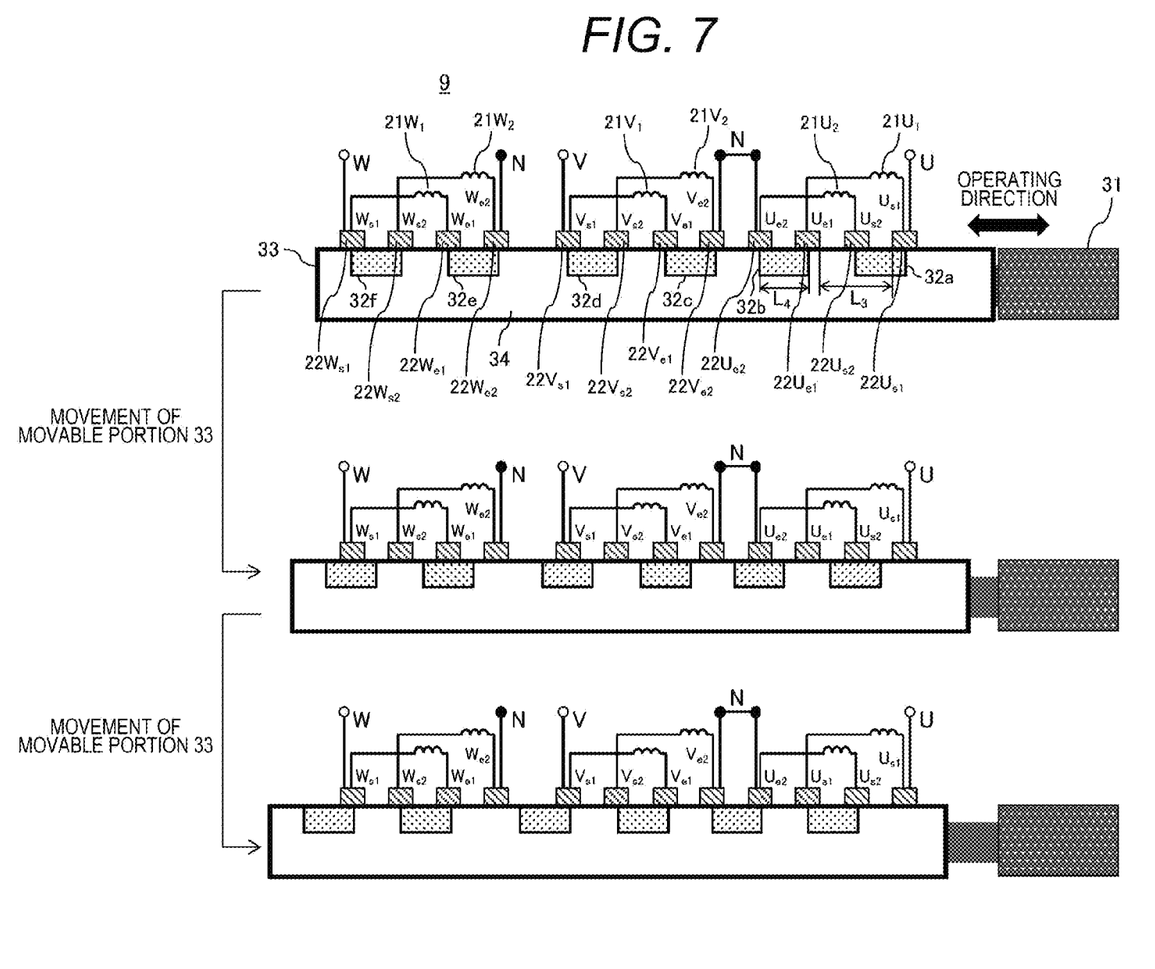
FIG. 7 is a configuration diagram of a winding switching device according to a second embodiment.

FIG. 7 is a configuration diagram of a winding switching device according to a second embodiment of the invention. Note that FIG. 7 also illustrates the operation of the winding switching device. In order not to complicate the drawing, most of the symbols indicating each part of the winding switching device are illustrated only in the upper part of FIG. 7.

The upper part of FIG. 7 is the upper part of FIG. 1, that is, the case where the movable portion 33 is stopped at the first position and the phase windings are connected in parallel. Further, the lower part of FIG. 7 is the case of the lower part of FIG. 1, that is, the case where the movable portion 33 is stopped at the second position and the phase windings are connected in series. The central part of FIG. 7 is a case where each phase winding is opened as described later.

Further, points different from the first embodiment will be mainly described.

In the second embodiment, the distance between the electrodes $22U_{s1}$ and the electrodes $22U_{e1}$ in the direction in which the plurality of electrodes and the plurality of conductor portions are lined up (in FIG. 7, the distance $L_3$ between the end of the electrode $22U_{s1}$ and the end of the electrode $22U_{e1}$ facing each other) is set to a value larger than the width $L_4$ of the conductor portion 32*b* (the same for other conductor portions) ($L_3 > L_4$). As a result, when the movable portion 33 stops at the position (third position) illustrated in the central part of FIG. 7, the electrode $22U_{s1}$ and the electrode $22U_{e1}$ are in a non-contact state with the conductor portion, that is, the open state of the U-phase winding $21U_1$ and the U-phase winding $21U_2$.

Further, in the second embodiment, the distance between the electrodes $22V_{e2}$ and the electrodes $22V_{s2}$ in the direction in which the plurality of electrodes and the plurality of conductor portions are lined up (in FIG. 7, the distance between the end of the electrode $22V_{e2}$ and the end of the electrode $22V_{s2}$ facing each other) is set to a value larger than the width of the conductor portion 32*d* (the same for other conductor portions). This brings about a non-contact state between the electrode $22V_{e2}$ and the electrode $22V_{32}$ and the conductor portion, that is, the open state of the V-phase winding $21V_1$ and the V-phase winding $21V_2$ at the third position.

Further, in the second embodiment, the distance between the electrodes $22W_{e2}$ and the electrodes $22W_{s2}$ in the direction in which the plurality of electrodes and the plurality of conductor portions are lined up (in FIG. 7, the distance between the end of the electrode $22W_{e2}$ and the end of the electrode $22W_{s2}$ facing each other) is set to a value larger than the width of the conductor portion 32*f* (the same for other conductor portions). This brings about a non-contact state between the electrode $22W_{e2}$ and the electrode $22W_{s2}$ and the conductor portion, that is, an open state of the W-phase winding $21W_1$ and the W-phase winding $21W_2$ at the third position.

As described above, according to the second embodiment, the connection state of each phase winding of the three-phase AC motor can be opened by the winding switching device. As a result, the rotating electric machine rotates by mechanical inertia when the inverter is stopped without providing a current cutoff device between the output of the inverter main circuit and the electric motor, and operates as a generator, so that it is possible to prevent the flow of induction current to the windings and the inverter main circuit. Therefore, the size of the rotating electric machine drive system can be reduced in combination with the fact that the size of the winding switching device itself can be reduced as in the first embodiment.

Third Embodiment

Figure 8:
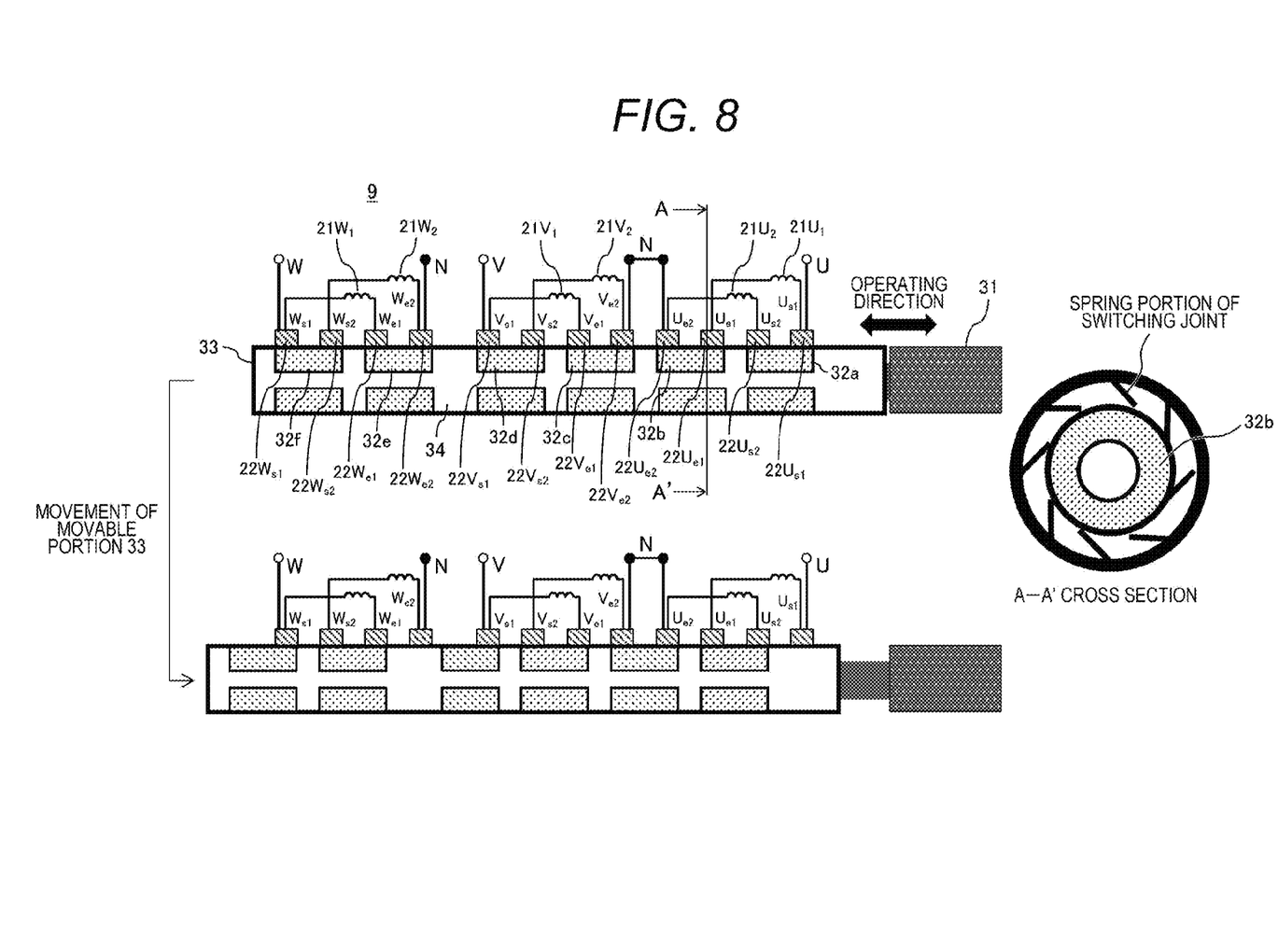
FIG. 8 is a configuration diagram of a winding switching device according to a third embodiment.

FIG. 8 is a configuration diagram of a winding switching device according to a third embodiment of the invention. In addition, FIG. 8 also illustrates the operation of the winding switching device. In order not to complicate the drawing, most of the symbols indicating each part of the winding switching device are illustrated only in the upper part of FIG. 8. In addition, a cross-sectional view taken along line A-A' is also illustrated in FIG. 8.

Further, points different from the first embodiment will be mainly described.

As illustrated in the cross-sectional view taken along line A-A', the winding switching device 9 of the third embodiment has a substantially cylindrical outer shape. The electrodes connecting the phase windings ($22U_{si}$, $22U_{ei}$, $22V_{si}$, $22V_{ei}$, $22W_{si}$, $22W_{ei}$: i=1, 2) are arranged inside a substantially cylindrical case. Further, the movable portion 33 having the conductor portions (32*a* to 32*f*) has a substantially cylindrical shape.

Since the electrodes connecting the phase windings are arranged inside the case having a substantially cylindrical shape, even if the electrodes are misaligned or the center position of the movable portion 33 is displaced, the electrodes come into even contact with the movable portion 33. As a result, the life span of the electrode and the conductor portion is extended, and the replacement cycle of the electrode and the conductor portion or the winding switching device itself can be extended.

In the third embodiment, the configuration other than the above is the same as that of the first embodiment, including the relationship between $L_1$ and $L_2$ ($L_1 > L_2$) illustrated in FIG. 1 (not illustrated in FIG. 8).

As described above, according to the third embodiment, the size of the winding switching device 9 can be reduced, and the reliability and maintainability of the winding switching device 9 are improved.

In addition, in the third embodiment, the arrangement of the electrodes in the second embodiment may be applied. As a result, the columnar winding switching device 9 can have a winding opening function.

Figure 9:
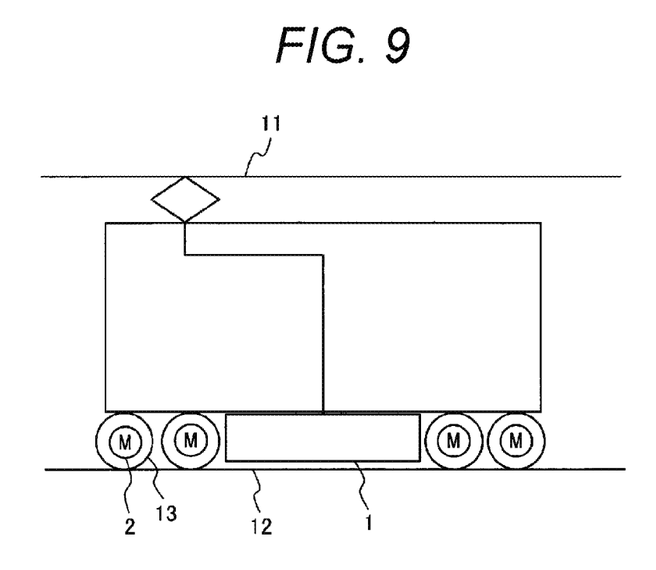
FIG. 9 is a configuration diagram of an electric railway vehicle according to an embodiment.

FIG. 9 is a configuration diagram of an electric railway vehicle according to an embodiment of the invention.

The electric railway vehicle illustrated in FIG. 9 is driven by a rotating electric machine drive system 1 including a three-phase AC motor 2 (M). As the rotating electric machine drive system 1, one embodiment of the invention illustrated in FIG. 2 is applied. Further, electric power is supplied to the rotating electric machine drive system 1 from an overhead line 11 via a current collector. The overhead line 11 may be either a DC overhead line or an AC overhead line. In the case of the AC overhead line, the electric railway vehicle is equipped with an AC/DC converter as a DC power source ("3" in FIG. 2). The electric ground in the electric railway vehicle is grounded via wheels 13 and a rail 12.

The three-phase AC motor 2 is driven at a variable speed by the three-phase AC power from the inverter main circuit in the rotating electric machine drive system 1. The three-phase AC motor 2 is mechanically connected to the axle of the electric railway vehicle, and the running of the electric railway vehicle is controlled by the three-phase AC motor 2.

Any of the first to third embodiments is applied as the winding switching device included in the rotating electric machine drive system.

According to the above embodiment, the electric railway vehicle can be operated with high efficiency by switching the winding connection state of the three-phase AC motor 2 by the winding switching device. Further, since the winding switching device is miniaturized, the increase in size of the rotating electric machine drive system is suppressed even though the rotating electric machine drive system is provided with the winding switching device. Therefore, a rotating electric machine drive system including a winding switching device can be easily mounted on an electric railway vehicle.

Further, the invention is not limited to the above-described embodiments, but various modifications may be contained. For example, the above-described embodiments of the invention have been described in detail in a clearly understandable way, and are not necessarily limited to those having all the described configurations. In addition, some of the configurations of each embodiment may be omitted, replaced with other configurations, and added to other configurations.

For example, as a rotating electric machine, in addition to a permanent magnet synchronous motor, a winding field synchronous motor, an induction motor, a switched reluctance motor, and the like can be applied.

Further, the rotating electric machine drive system can be applied not only to electric railway vehicles but also to electric devices such as electric vehicles, hybrid vehicles, and construction machines that operate at variable speeds.

REFERENCE SIGNS LIST

1 rotating electric machine drive system
2 three-phase AC motor
3 DC power source
4 capacitor
5 semiconductor switching element
6 power module
7 freewheeling diode
8 three-phase AC power source
9 winding switching device
10 control device
11 overhead line
12 rail
13 wheel
21 three-phase winding terminal group
21$U_1$, 21$U_2$ U-phase winding
21$V_1$, 21$V_2$ V-phase winding
21$W_1$, 21$W_2$ W-phase winding
22$U_{s1}$, 22$U_{s2}$, 22$U_{e1}$, 22$U_{e2}$ electrode
22$V_{s1}$, 22$V_{s2}$, 22$V_{e1}$, 22$V_{e2}$ electrode
22$W_{s1}$, 22$W_{s2}$, 22$W_{e1}$, 22$W_{e2}$ electrode
31 actuator
32$a$ to 32$f$ conductor portion
33 movable portion

The invention claimed is:

1. A winding switching device for switching parallel connection and series connection of a plurality of windings of a rotating electric machine, comprising:
   a plurality of electrodes that are connected to the plurality of windings and a power source, wherein the plurality of electrodes are arranged side by side in a predetermined direction at interval from each other;
   a movable portion that is in contact with the plurality of electrodes and includes a plurality of conductor portions, wherein the plurality of conductor portions are arranged side by side in the predetermined direction in which the plurality of electrodes are lined up at the interval from each other; and
   an actuator that slides the movable portion a distance from a first position to a second position along the predetermined direction in which the plurality of electrodes are lined up, wherein the distance is equal to the interval;
   wherein, according to a contact state between the plurality of electrodes and the plurality of conductor portions, the plurality of windings are connected in parallel at the first position, and the plurality of windings are connected in series at the second position,
   the plurality of electrodes include:
      a first electrode connected to a first phase winding of the rotating electric machine in the plurality of windings, and
      a second electrode connected to a second phase winding of the rotating electric machine in the plurality of windings, and
   the first electrode and the second electrode are adjacent to each other, and form a neutral point.

2. The winding switching device according to claim 1, wherein
   the plurality of the electrodes include
   a third electrode connected to the second phase winding of the rotating electric machine in the plurality of winding, and
   a fourth electrode connected to a third phase winding of the rotating electric machine in the plurality of windings, and
   the third electrode and the fourth electrode are adjacent to each other, the third electrode is connected to the power source, and the fourth electrode forms the neutral point.

3. The winding switching device according to claim 1, wherein
   the first position corresponds to a high speed range of the rotating electric machine, and the second position corresponds to a low speed range of the rotating electric machine.

4. The winding switching device according to claim 1, wherein, at a third position of the movable portion, the plurality of windings are opened.

5. The winding switching device according to claim 4, wherein
the plurality of the electrodes include:
a third electrode that is connected to a winding start of the winding and connected to the power source, and
a fourth electrode connected to a winding end of the winding.

6. The winding switching device according to claim 4, wherein the third position is between the first position and the second position.

7. The winding switching device according to claim 1, wherein an outer shape is a cylindrical shape.

8. A rotating electric machine drive system, comprising:
a rotating electric machine;
an inverter that supplies AC power to the rotating electric machine; and
the winding switching device according to claim 1, wherein the winding switching device of the windings of the rotating electric machine is connected between the rotating electric machine and an output of the inverter.

9. An electric machine that is operated at variable speed by the rotating electric machine drive system according to claim 8.

* * * * *